L. D. LOTHROP.
Stove or Range Kettle.

No. 123,569.　　　　　　　　　　Patented Feb. 13, 1872.

Witnesses.
S. N. Piper
L. N. Möller

L. D. Lothrop,
by his attorney
R. H. Eddy 123,569

UNITED STATES PATENT OFFICE.

LLEWELLYN D. LOTHROP, OF DOVER, NEW HAMPSHIRE.

IMPROVEMENT IN STOVE OR RANGE KETTLES.

Specification forming part of Letters Patent No. 123,569, dated February 13, 1872.

*To all persons to whom these presents may come:*

Be it known that I, LLEWELLYN D. LOTHROP, of Dover, in the county of Strafford and State of New Hampshire, have invented a new and useful Improvement in Range or Stove Kettles; and I do hereby declare the same to be fully described in the following specification and represented in the accompanying drawing, of which—

Figure 1:
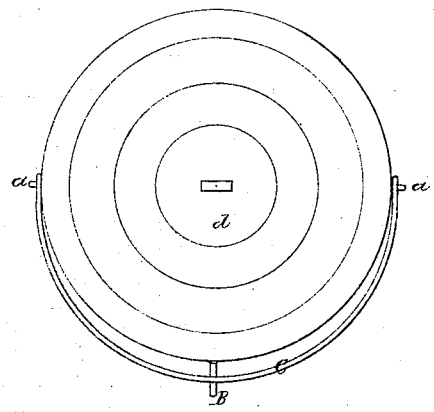
Figure 2:
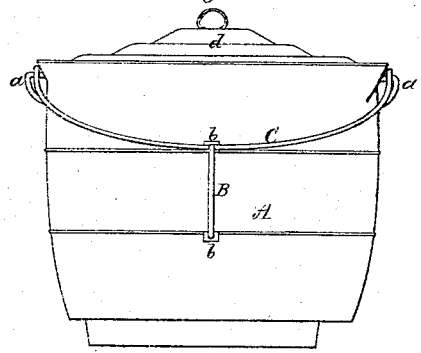
Figure 3:
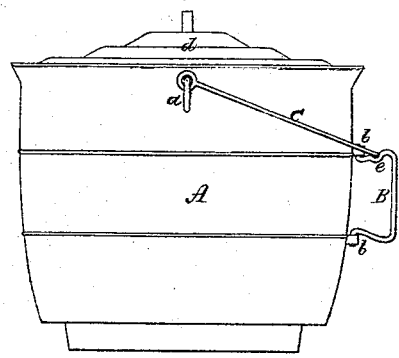

Figure 1 is a top view, Fig. 2 is a front elevation, and Fig. 3 is a side elevation of a kettle provided with my invention.

The bail of a stove or range kettle, of necessity, has to be of larger radius than the kettle or cover to enable the bail to be turned down to or below a horizontal position in order that it may not interfere with the removal of the cover from or its application to the mouth of the kettle. The bail, therefore, as usually made, when turned down, brings up at its middle or along or against the side of the kettle, and as a consequence, while there may be hot water in the kettle, such bail soon becomes heated at the place where it is required to be grasped by the hand in order to lift it and the kettle from the stove or range. One object of my addition to the kettle is to provide it with a rest or support for the bail to keep the latter when down, at and near its middle, out of contact with the side of the kettle, so as to allow a free circulation of air around the bail to keep it cool. Another object of my invention is to provide the kettle with an auxiliary handle or smaller bail applied to its side, the same being to enable a person, while supporting the kettle with one hand applied to the main bail, to tip the kettle by his other hand applied to the little or auxiliary bail, and thereby save the necessity of either applying the hand to the bottom of the kettle or straining the hand-hold of the main bail by tipping the kettle by the latter and in the direction of the diameter of the said bail.

In carrying out my invention I apply to the side of the body A of the kettle, midway between the main-bail ears or supports *a a*, and below such, as shown, a smaller bail or handle, B, with one of its supporting-ears, *b b*, directly over the other, so that the said small bail may swing horizontally. The arrangement of the said lateral or side bail is also such that the larger or main bail C, when dropped down below the mouth of the pot or kettle, may rest directly on the smaller bail without contact with the side of the kettle. The cover of the kettle is shown at *d*. The smaller bail I prefer to make with a hollow or recess, *e*, in its top to receive the main bail when down, such being to enable the main bail, when in the recess, to preserve the little bail from turning back against the side of the kettle. The smaller bail, by being arranged vertically and to swing horizontally, is much preferable to such a bail arranged horizontally and to swing vertically, because, as arranged with and applied to the kettle in manner as first mentioned, it not only answers the purpose of supporting the main bail or handle to better advantage when down, but is more convenient for a person to grasp it, and by means of it to tip the kettle; furthermore, it will fold back against the kettle to better advantage.

I am aware that it is not new to apply to the side or end of a coal-hod or other like vessel a small handle to enable a person to tip the hod or vessel with one hand while having hold of the bail or main handle with the other; therefore I make no claim to such in the abstract. I am also aware of the subject of the United States patent No. 31,202, wherein the handle is fixed on the side of the kettle, but so as not to be capable of being turned aside, as in my kettle, or of serving as a support for the main bail when turned down. By having the auxiliary bail pivoted to the kettle so as to fold back upon it, the kettle can be packed in less space, or will take up less room in a closet or other place. I am not aware, however, that any range or stove kettle has been provided with an auxiliary bail affixed or applied to its side and having any such arrangement therewith and with the main bail as exists in my improved kettle, as hereinbefore described; therefore,

What I claim as a new or improved manufacture and my invention is—

1. The stove or range kettle, having a smaller or auxiliary bail pivoted to its side and arranged, relatively to the main bail and the kettle-body, substantially in manner as described and represented.

2. I also claim, in combination with the kettle-body and main bail, the lesser or auxiliary bail with the hollow or concavity $e$ in its top, arranged to receive the main bail when down so as to cause it to operate to hold the smaller bail outward or from swinging back against the kettle-side.

LLEWELLYN D. LOTHROP.

Witnesses:
R. H. EDDY,
J. R. SNOW.